(12) United States Patent
Kawashima et al.

(10) Patent No.: US 12,012,493 B2
(45) Date of Patent: Jun. 18, 2024

(54) COMPOSITE SEMIPERMEABLE MEMBRANE AND METHOD FOR MANUFACTURING SAME

(71) Applicants: NITTO DENKO CORPORATION, Osaka (JP); HIROSHIMA UNIVERSITY, Hiroshima (JP)

(72) Inventors: Toshiyuki Kawashima, Osaka (JP); Shinichi Inoue, Osaka (JP); Masahiko Hirose, Osaka (JP); Joji Ohshita, Hiroshima (JP); Toshinori Tsuru, Hiroshima (JP); Kazuki Yamamoto, Chiba (JP)

(73) Assignees: NITTO DENKO CORPORATION, Osaka (JP); HIROSHIMA UNIVERSITY, Hiroshima (JP)

( * ) Notice: Subject to any disclaimer, the term of this patent is extended or adjusted under 35 U.S.C. 154(b) by 0 days.

(21) Appl. No.: 18/094,676

(22) Filed: Jan. 9, 2023

(65) Prior Publication Data
US 2023/0145799 A1    May 11, 2023

Related U.S. Application Data

(62) Division of application No. 16/965,467, filed as application No. PCT/JP2019/002047 on Jan. 23, 2019, now Pat. No. 11,590,458.

(30) Foreign Application Priority Data

Jan. 30, 2018  (JP) .................................. 2018-013477
Dec. 26, 2018  (JP) .................................. 2018-242769

(51) Int. Cl.
*B01D 69/12*  (2006.01)
*B01D 67/00*  (2006.01)
(Continued)

(52) U.S. Cl.
CPC .......... *C08J 7/046* (2020.01); *B01D 67/0079* (2013.01); *B01D 69/106* (2022.08); *B01D 69/12* (2013.01);
(Continued)

(58) Field of Classification Search
CPC ... C08J 7/046; C08J 7/04; C08J 7/0427; C08J 2381/06; C08J 2383/04; C08J 2483/08;
(Continued)

(56) References Cited

U.S. PATENT DOCUMENTS

2011/0017662 A1  1/2011  Okabe et al.
2011/0139708 A1  6/2011  Okabe et al.
(Continued)

FOREIGN PATENT DOCUMENTS

CN   102905780   1/2013
CN   106458649   2/2017
(Continued)

OTHER PUBLICATIONS

Office Action issued in Taiwanese Patent Application No. 108102904, Jul. 7, 2023, translation.
(Continued)

*Primary Examiner* — Waqaas Ali
(74) *Attorney, Agent, or Firm* — GREENBLUM & BERNSTEIN, P.L.C.

(57) ABSTRACT

A composite semipermeable membrane capable of forming, on a surface of a porous support in a highly reproducible manner, a separation layer that is extremely thin and that exhibits superior separability. It provides, on a surface of a porous support, a composite semipermeable membrane that has an organic/inorganic hybrid separation layer that is extremely thin and that exhibits superior separability. A method for manufacturing a composite semipermeable membrane includes forming, on a surface of a porous
(Continued)

support, a separation layer containing a cross-linked condensate having a siloxane bond by bringing an organic solution that contains an organic silicon compound containing three or more reactive functional groups, each of which is at least one type selected from a hydrolyzable group and a hydroxyl group, into contact with water or an aqueous solution on the porous support, and by performing interfacial polycondensation of the organic silicon compound.

4 Claims, 2 Drawing Sheets

(51) Int. Cl.
  *B01D 69/10* (2006.01)
  *B01D 71/70* (2006.01)
  *C08J 7/04* (2020.01)
  *C08J 7/046* (2020.01)
(52) U.S. Cl.
  CPC ......... *B01D 69/125* (2013.01); *B01D 71/702* (2022.08); *C08J 7/04* (2013.01); *C08J 7/0427* (2020.01); *C08J 2381/06* (2013.01); *C08J 2383/04* (2013.01); *C08J 2483/08* (2013.01)
(58) Field of Classification Search
  CPC .. C08J 2483/04; B01D 67/0079; B01D 69/10; B01D 69/125; B01D 71/70; B01D 2323/40; B01D 2325/04; B01D 67/0006; B01D 69/02; B01D 2323/30; Y02A 20/131; C01B 33/12
  See application file for complete search history.

(56) References Cited

U.S. PATENT DOCUMENTS

| | | |
|---|---|---|
| 2013/0098832 A1 | 4/2013 | Matsuyama et al. |
| 2013/0284664 A1 | 10/2013 | Tagaki et al. |
| 2015/0265977 A1 | 9/2015 | Carr et al. |
| 2017/0182469 A1 | 6/2017 | Mochizuki et al. |
| 2017/0326506 A1 | 11/2017 | Tokuyama et al. |

FOREIGN PATENT DOCUMENTS

| | | | |
|---|---|---|---|
| CN | 107001859 | 8/2017 | |
| JP | 2011-245419 A | 12/2011 | |
| JP | 5110227 B2 | 12/2012 | |
| JP | 2015-110218 A | 6/2015 | |
| JP | 2016-163869 | 9/2016 | |
| JP | 2016-163872 A | 9/2016 | |
| JP | 2016-203132 A | 12/2016 | |
| WO | 2009/113541 A1 | 9/2009 | |
| WO | 2010/029985 A1 | 3/2010 | |
| WO | 2011/136029 A1 | 11/2011 | |
| WO | WO-2011136029 A1 * | 11/2011 | .......... B01D 61/025 |
| WO | 2016/094784 A1 | 6/2016 | |

OTHER PUBLICATIONS

ISR issued in International Pat. Appl. No. PCT/JP2019/002047, dated Apr. 9, 2019, English translation.
IPRP issued in International Pat. Appl. No. PCT/JP2019/002047, dated Apr. 4, 2020, English translation.
Office Action issued in CN Patent Application No. 201980007708.0, Nov. 3, 2021, English translation.
Liang Yu et al., "Fabrication and Microstructure Tuning of a Pyrimidine-Bridged Organoalkoxysilane Membrane for $CO_2$ Separation", Industrial & Engineering Chemistry Research, vol. 56, pp. 1316-1326, Nov. 11, 2017.
Yamamoto et al., "Preparation of bridged polysilsesquioxane-based membranes containing 1,2,3-triazole moieties for water desalination", Polymer Journal, vol. 49, pp. 401-406 Jan. 25, 2017.
Office Action issued in Chinese Application No. 201980007708.0, Apr. 15, 2022, translation.
Office Action issued in Chinese Patent Application No. 201980007708.0, Aug. 25, 2022, translation.
Office Action issued in Japanese Patent Application No. 2018-242769, drafted Sep. 14, 2022, translation.
Office Action issued in Taiwanese Patent Application No. 108102904, Nov. 8, 2022, translation.

* cited by examiner

COMPOSITE SEMIPERMEABLE MEMBRANE AND METHOD FOR MANUFACTURING SAME

The present application is a Divisional of U.S. application Ser. No. 16/965,467 filed Jul. 28, 2020, which is a U.S. National stage of International Patent Application No. PCT/JP2019/002047, filed Jan. 23, 2019, which claims priority to Japanese Application No. 2018-013477, filed Jan. 30, 2018, and Japanese Application No. 2018-242769, filed Dec. 26, 2018. The disclosures of each of the applications listed above are incorporated by reference herein in their entireties.

TECHNICAL FIELD

The present invention relates to a composite semipermeable membrane in which an organic-inorganic hybrid type separation layer is formed on a surface of a porous support and a method for manufacturing the same. The composite semipermeable membrane is suitably used for production of ultrapure water, desalination of brackish water or sea water, etc., and usable for removing or collecting pollution sources or effective substances from pollution, which causes environment pollution occurrence, such as dyeing drainage and electrodeposition paint drainage, leading to contribute to closed system for drainage. Furthermore, the membrane can be used for concentration of active ingredients in foodstuffs usage, for an advanced water treatment, such as removal of harmful component in water purification and sewage usage etc. Moreover, the membrane can be used for waste water treatment in oil fields or shale gas fields. Further, the composite semipermeable membrane can be used as a gas separation membrane that selectively separates a specific gas species from a mixed gas. Furthermore, the composite semipermeable membrane can be used as a separation membrane for a PV method (pervaporation method) or a VP method (vapor permeation method) for separating alcohol and water from an aqueous alcohol solution.

BACKGROUND ART

The composite semipermeable membrane is called an RO (reverse osmosis) membrane, an NF (nanofiltration) membrane, or a FO (forward osmosis) membrane, depending on the filtration performance and treatment method of the membrane, and such membrane can be used for the production of ultrapure water, seawater desalination, desalination of brackish water, waste water recycling treatment, or the like.

Examples of a composite semipermeable membrane used industrially include a composite semipermeable membrane in which a skin layer containing a polyamide-based resin is formed on a surface of a porous support.

However, since the skin layer of the composite semipermeable membrane is formed of the polyamide-based resin, there are problems in heat resistance, chemical resistance, and abrasion resistance.

On the other hand, an inorganic membrane formed of a ceramic material such as silica has excellent heat resistance, chemical resistance, and abrasion resistance, and is therefore expected as a robust separation membrane.

For example, Patent Document 1 proposes a separation membrane for water treatment including a separation functional layer having an organic-inorganic hybrid structure containing a Si element or the like. Patent Document 1 describes that the separation functional layer is formed by applying a reaction liquid containing a silicon compound having an ethylenically unsaturated group and a hydrolyzable group, and a compound having an ethylenically unsaturated group onto a porous layer to condense the hydrolyzable group and polymerize the ethylenically unsaturated group, and thus to turn these compounds into high-molecular weight compounds.

Patent Document 2 proposes a method of manufacturing a separation filter, including a polymer sol preparation step of preparing a polymer sol by mixing a compound represented by $(RO)_3Si—X—Si(OR)_3$ and a solvent containing water, an application step of applying the polymer sol onto a heat-resistant polymer support formed from a membrane or hollow porous body, and a firing step of forming an inorganic-organic hybrid membrane having a —Si—X—Si— bond on the heat-resistant polymer support by firing.

On the other hand, a material formed of a polymer compound has a specific gas permeability for each material. Based on its properties, specific gas components (such as carbon dioxide, hydrogen, oxygen, nitrogen, and methane) can be selectively permeated and separated through a membrane formed from a specific polymer compound. The technique can be used when, for example, carbon dioxide is separated and recovered from off-gas of an oil field, exhaust gas of refuse incineration or thermal power generation, natural gas, mixed gas obtained by gasifying coal, or the like.

For example, Patent Document 3 proposes a gas separation membrane which has a resin layer containing a compound having a siloxane bond, in which positron lifetime $\tau3$ of a third component in a case where the positron is implanted at a strength of 1 keV from the surface of the resin layer containing a compound having a siloxane bond is in a range of 3.40 to 4.20 ns.

PRIOR ART DOCUMENTS

Patent Documents

Patent Document 1: JP patent No. 5110227
Patent Document 2: JP-A-2015-110218
Patent Document 3: JP-A-2016-163872

SUMMARY OF THE INVENTION

Problems to be Solved by the Invention

However, with the method of producing a separation membrane (separation filter) described in Patent Documents 1 to 3, it is difficult to form a very thin separation layer having excellent separation performance on a support with good reproducibility.

The present invention has been made in view of the above circumstances, and an object thereof is to provide a method for manufacturing a composite semipermeable membrane capable of forming a very thin separation layer having excellent separation performance on a surface of a porous support with good reproducibility. Another object of the present invention is to provide a composite semipermeable membrane having a very thin organic-inorganic hybrid type separation layer having excellent separation performance on a surface of a porous support.

Means for Solving the Problems

That is, the present invention relates to a method for manufacturing a composite semipermeable membrane, comprising bringing an organic solution containing an organosilicon compound having three or more reactive functional groups of at least one selected from a hydrolyzable group and a hydroxyl group into contact with water or an aqueous solution on a porous support to carry out interfacial polycondensation of the organosilicon compound and form a separation layer containing a cross-linked condensate having a siloxane bond on a surface of the porous support.

The hydrolyzable group is preferably halogen, an alkoxy group, an alkenyloxy group, an acyloxy group, an aryloxy group, a ketoxime group, an aminohydroxy group, an amino group, an alkylamino group, a cyano group, and an isocyanate group.

The organosilicon compound preferably contains a compound represented by the following general formula (1):

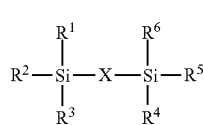

(1)

wherein $R^1$ to $R^6$ are each independently hydrogen, a hydroxyl group, halogen, an alkyl group having 1 to 12 carbon atoms, an alkoxy group having 1 to 12 carbon atoms, an alkenyloxy group having 2 to 12 carbon atoms, an acyloxy group having 2 to 12 carbon atoms, an aryloxy group, a ketoxime group, an amino group, an alkylamino group, a cyano group, an aminohydroxy group, or an isocyanate group, and X is a saturated hydrocarbon group having 1 to 12 carbon atoms, an unsaturated hydrocarbon group having 2 to 12 carbon atoms, a functional group having a heterocycle, or —$R^7$—$NR^8$—$R^9$— (wherein $R^7$ and $R^9$ are each independently a saturated hydrocarbon group having 1 to 12 carbon atoms or an unsaturated hydrocarbon group having 2 to 12 carbon atoms, and Re is hydrogen, an alkyl group having 1 to 12 carbon atoms, or an alkenyl group having 2 to 12 carbon atoms).

The aqueous solution preferably contains a surfactant.

Further, the present invention relates to a composite semipermeable membrane comprising a separation layer on a surface of a porous support, wherein the separation layer comprises a cross-liked condensate having a siloxane bond and a —Si—$R^7$—$NR^8$—$R^9$—Si-bond ($R^7$ and $R^9$ are each independently a saturated hydrocarbon group having 1 to 12 carbon atoms or an unsaturated hydrocarbon group having 2 to 12 carbon atoms, and $R^8$ is hydrogen, an alkyl group having 1 to 12 carbon atoms, or an alkenyl group having 2 to 12 carbon atoms).

Further, the present invention relates to a composite semipermeable membrane comprising a separation layer on a surface of a porous support,
wherein the separation layer comprises a cross-liked condensate having a siloxane bond and a —Si—Y—Si— bond (Y is a functional group having a heterocycle).

The separation layer preferably has a thickness of 500 nm or less.

Effect of the Invention

The method for manufacturing a composite semipermeable membrane of the present invention is characterized by polycondensing the organosilicon compound at an interface between an organic solution and water or an aqueous solution. Thereby, a very thin separation layer having excellent separation performance can be formed on the surface of the porous support. The method for manufacturing a composite semipermeable membrane of the present invention does not require complicated and technical steps, and the separation layer can be formed by a simple method. Therefore, there is an advantage that it is possible to not only mass-produce the composite semipermeable membranes at low cost, but also suppress variations in the performance of the composite semipermeable membrane. The separation layer of the composite semipermeable membrane of the present invention is very thin, and is formed from a cross-linked condensate having a siloxane bond and a —Si—$R^7$—$NR^8$—$R^9$—Si— bond, or a cross-linked condensate having a siloxane bond and a —Si—Y—Si— bond (Y is a functional group having a heterocycle), and therefore, the composite semipermeable membrane of the present invention has excellent separation performance, heat resistance, chemical resistance, and abrasion resistance.

MODE FOR CARRYING OUT THE INVENTION

Figure 1:
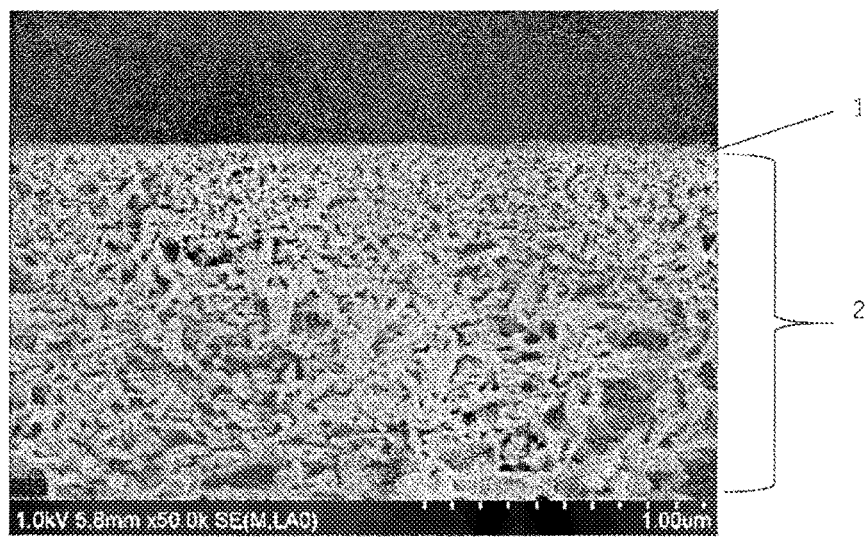
FIG. 1 is a SEM photograph of a cross section of a composite semipermeable membrane prepared in Example 1.

Hereinafter, embodiments of the present invention will be described. A method for manufacturing a composite semipermeable membrane of the present invention contains bringing an organic solution containing an organosilicon compound having three or more reactive functional groups of at least one selected from a hydrolyzable group and a hydroxyl group into contact with water or an aqueous solution on a porous support to carry out interfacial polycondensation of the organosilicon compound and form a separation layer containing a cross-linked condensate having a siloxane bond on a surface of the porous support.

In the present invention, an organosilicon compound having three or more reactive functional groups of at least one selected from a hydrolyzable group and a hydroxyl group is used as a material of a separation layer. The organosilicon compound may be used alone or in combination of two or more organosilicon compounds having different reactive functional groups.

The organosilicon compound only needs to have three or more reactive functional groups of at least one selected from a hydrolyzable group and a hydroxyl group, and other structures are not particularly limited.

The hydrolyzable group is not particularly limited and may be a known hydrolyzable group, and examples thereof include hydrogen, halogen, alkoxy group, alkenyloxy group, acyloxy group, aryloxy group, ketoxime group, aminohydroxy group, amino group, alkylamino group, cyano group, and isocyanate group. Examples of the halogen include fluorine, chlorine, bromine and iodine, and chlorine is preferable. Examples of the alkoxy group include those having 1 to 12 carbon atoms, and those having 1 to 4 carbon atoms are preferable. Examples of the alkenyloxy group include those having 2 to 12 carbon atoms, and those having 2 to 4 carbon atoms are preferable. Examples of the acyloxy group include those having 2 to 12 carbon atoms, and those having 2 to 5 carbon atoms are preferable.

Examples of the aryloxy group include a phenoxy group. Examples of the ketoxime group include a methylethylketoxime group, a dimethylketoxime group, and a diethylketoxime group. Examples of the aminohydroxy group include a dimethylaminohydroxy group, a diethylaminohydroxy group, and a methylethylaminohydroxy group. Examples of the alkylamino group include a monoalkylamino group having 1 to 4 carbon atoms and a dialkylamino group having 1 to 4 carbon atoms. Among them, chlorine, an alkoxy group, an amino group, and an acyloxy group are particularly preferable from the viewpoint of reactivity and the like.

The organosilicon compound preferably contains a compound represented by the following general formula (1). In particular, by using a compound represented by the following general formula (1) as the organosilicon compound, in which X is —$R^7$—$NR^8$—$R^9$—, a separation layer containing a cross-linked condensate having a siloxane bond and a —Si—$R^7$—$NR^8$—$R^9$—Si— bond can be formed, and a composite semipermeable membrane having more excellent separation performance, heat resistance, chemical resistance, and abrasion resistance can be obtained. By using a compound represented by the following general formula (1) as the organosilicon compound, in which X is a functional group having a heterocycle, a separation layer containing a cross-linked condensate having a siloxane bond and a —Si—Y—Si— bond (Y is a functional group having a heterocycle) can be formed, and a composite semipermeable membrane having more excellent separation performance, heat resistance, chemical resistance, and abrasion resistance can be obtained.

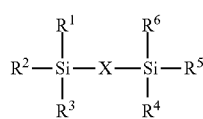

(1)

($R^1$ to $R^6$ are each independently hydrogen, a hydroxyl group, halogen, an alkyl group having 1 to 12 carbon atoms, an alkoxy group having 1 to 12 carbon atoms, an alkenyloxy group having 2 to 12 carbon atoms, an acyloxy group having 2 to 12 carbon atoms, an aryloxy group, a ketoxime group, an amino group, an alkylamino group, a cyano group, an aminohydroxy group, or an isocyanate group, and X is a saturated hydrocarbon group having 1 to 12 carbon atoms, an unsaturated hydrocarbon group having 2 to 12 carbon atoms, a functional group having a heterocycle, or —$R^7$—$NR^8$—$R^3$— (wherein $R^7$ and $R^9$ are each independently a saturated hydrocarbon group having 1 to 12 carbon atoms or an unsaturated hydrocarbon group having 2 to 12 carbon atoms, and $R^8$ is hydrogen, an alkyl group having 1 to 12 carbon atoms, or an alkenyl group having 2 to 12 carbon atoms).)

In the above formula, the alkyl group preferably has 2 to 4 carbon atoms, the alkoxy group preferably has 1 to 4 carbon atoms, the alkenyloxy group preferably has 2 to 4 carbon atoms, and the acyloxy group preferably has 2 to 5 carbon atoms. Examples of the halogen, an aryloxy group, a ketoxime group, an alkylamino group, and an aminohydroxy group include those exemplified above. In the above X, from the viewpoint of water permeability, the saturated hydrocarbon group preferably has 1 to 4 carbon atoms, and the unsaturated hydrocarbon group preferably has 2 to 4 carbon atoms.

In the functional group having a heterocycle, the heterocycle is not particularly limited and may be a known heterocycle, and examples thereof include nitrogen-containing heterocycles such as a pyrrolidine ring, a pyrrole ring, an imidazole ring, a pyrazole ring, an imidazoline ring, a triazole ring, a piperidine ring, a pyridine ring, a pyridazine ring, a pyrimidine ring, a pyrazine ring, an indole ring, a benzotriazole ring, and quinoline ring; oxygen-containing heterocycles such as a tetrahydrofuran ring, a furan ring, a dioxolane ring, a tetrahydropyran ring, and a dioxane ring; sulfur-containing heterocycles such as a tetrahydrothiophene ring, a thiophene ring, and a tetrahydrothiopyran ring; and nitrogen- and oxygen-containing heterocycles such as an oxazole ring and a morpholine ring. Among them, a nitrogen-containing heterocycle is preferable from the viewpoint of reactivity and hydrophilicity. The functional group may have a linking group that links the heterocycle and Si. The linking group is not particularly limited, and examples thereof include an alkylene group, an alkyleneozy group, an alkenylene group, and an alkenyleneoxy group.

In the above —$R^7$—$NR^8$—$R^9$—, from the viewpoint of water permeability, $R^7$ and $R^9$ are each independently preferably a saturated hydrocarbon group having 1 to 4 carbon atoms or an unsaturated hydrocarbon group having 2 to 4 carbon atoms, and more preferably a saturated hydrocarbon group having 1 to 4 carbon atoms. Furthermore, in the above —$R^7$—$NR^8$—$R^9$—, from the viewpoint of water permeability, $R^3$ is preferably hydrogen or an alkyl group having 1 to 4 carbon atoms, and more preferably hydrogen.

In the compound represented by the general formula (1), it is preferable that two or more of $R^1$ to $R^2$ be alkoxy groups having 1 to 4 carbon atoms, and two or more of $R^4$ to $R^6$ be alkoxy groups having 1 to 4 carbon atoms, and it is more preferable that all of $R^1$ to $R^6$ be alkoxy groups having 1 to 4 carbon atoms.

Specific examples of the compound represented by the general formula (1) include bis((trimethoxysilyl)methyl)amine, bis((triethoxysilyl)methyl)amine, bis((2-trimethoxysilyl))ethyl)amine, bis((2-triethoxysilyl)ethyl)amine, bis((3-trimethoxysilyl)propyl)amine, bis((3-triethoxysilyl)propyl)amine, bis((trimethoxysilyl)methyl)methylamine, bis((triethoxysilyl)methyl)methylamine, bis(1-(trimethoxysilyl)ethyl)amine, bis(1-(triethoxysilyl)ethyl)amine, bis((4-trimethoxysilyl)butyl)amine, bis((4-triethoxysilyl)butyl)amine, 1,4-bis((triethoxysilyl)methyl)-1,2,3-triazole, 4,6-bis(3-(triethoxysilyl)propoxy)pyrimidine, 1,2-bis(triethoxysilyl)ethane, and 1,2-bis(triethoxysilyl)ethene. These may be used alone or in combination of two or more.

In the present invention, in order to obtain a cross-linked condensate having a dense cross-linked structure, it is preferable to use only an organosilicon compound having three or more of the reactive functional groups. However, as long as it is in a range that does not impair the effects of the present invention, an organosilicon compound having two reactive functional groups of at least one selected from a hydrolyzable group and a hydroxyl group may be used in combination. The organosilicon compound only needs to have two reactive functional groups of at least one selected from a hydrolyzable group and a hydroxyl group, and other structures are not particularly limited. The reactive functional group is not particularly limited and includes those exemplified above.

When the organosilicon compound having three or more of the reactive functional groups and the organosilicon compound having two reactive functional groups are used in combination, it is preferable to use 20% by weight or more of the organosilicon compound having three or more of the reactive functional groups in the whole thereof, and the content of the organosilicon compound is more preferably 50% by weight or more, still more preferably 70% by weight or more, even more preferably 80% by weight or more, and particularly preferably 90% by weight or more.

The porous support is not especially limited as long as it has a function for supporting the separation layer.

Materials for formation of the porous support include various materials, for example, polyarylether sulfones, such as polysulfones and polyether sulfones; polyimides; polyvinylidene fluorides; etc., and polysulfones and polyarylether sulfones are especially preferably used from a viewpoint of chemical, mechanical, and thermal stability. The thickness of this porous support is usually approximately 50 to 500 µm, and preferably approximately 100 to 200 µm, but the thickness is not necessarily limited to them. The porous support may be reinforced with backing by cloths, nonwoven fabric, etc.

The porous support may have a symmetrical structure or an asymmetrical structure. However, the asymmetrical structure is preferred from the viewpoint of satisfying both of supporting function and liquid permeability of the separation layer. The average pore diameter of the separation layer formed side of the porous support is preferably from 0.01 to 0.5 µm.

Further, an epoxy resin porous sheet may be used as the porous support. The average pore diameter of the epoxy resin porous sheet is preferably from 0.01 to 0.4 µm.

The separation layer is formed on a surface of the porous support by an interfacial polycondensation method. Specifically, an organic solution containing the organosilicon compound having three or more of the reactive functional groups is brought into contact with water or an aqueous solution on the porous support to carry out interfacial polycondensation of the organosilicon compound. Thereby, a separation layer containing a cross-linked condensate having a siloxane bond can be formed on the surface of the porous support.

In the manufacturing method of the present invention, a method (method A) of brining water or an aqueous solution into contact with the porous support to form a water film on the porous support, and then bringing the water film into contact with an organic solution containing the organosilicon compound having three or more of the reactive functional groups to carry out interfacial polycondensation of the organosilicon compound may be adopted, or a method (method B) of brining an organic solution containing the organosilicon compound having three or more of the reactive functional groups into contact with the porous support to form an organic solution film on the porous support, and then bringing the organic solution film into contact with water or an aqueous solution to carry out the organosilicon compound of the organic solution film may be adopted, and the method A is preferable. The contact method is not particularly limited, and examples thereof include a method of coating, spraying, or showering the solution or water on the porous support or the formed film, and a method of immersing the porous support surface or the surface of the formed film in a bath containing the solution or water.

An organic solvent of the organic solution is not particularly limited as long as it has low solubility in water, does not deteriorate the porous support, and dissolves the organosilicon compound, and examples thereof include saturated hydrocarbons such as hexane, heptane, octane and nonane, and halogen-substituted hydrocarbons such as 1,1,2-trichlorotrifluoroethane. These may be used alone or in combination of two or more. Among them, it is preferable to use a saturated hydrocarbon.

The concentration of the organosilicon compound in the organic solution is not particularly limited, but is preferably 1 to 20% by weight, and more preferably 3 to 5% by weight. When the concentration of the organosilicon compound is less than 1% by weight, a salt rejection rate tends to be low. On the other hand, when the concentration of the organosilicon compound exceeds 20% by weight, a water permeability coefficient tends to be low.

Various additives may be added to the organic solution and/or the aqueous solution in order to promote interfacial polycondensation and improve the separation performance of the obtained composite semipermeable membrane. Examples of the additives include surfactants such as sodium dodecylbenzene sulfonate, sodium dodecyl sulfate, and sodium lauryl sulfate, catalysts, and neutralizing agents. These may be used alone or in combination of two or more.

In the manufacturing method of the present invention, preferably, after the organic solution is in contact with water or an aqueous solution, an excess solution on the porous support is removed, and the formed film on the porous support is heated. Thereby, the polycondensation of the organosilicon compound can be promoted, and the mechanical strength, heat resistance, and the like of the separation layer can be increased. The heating temperature is usually about 60 to 150° ° C., preferably 100 to 150° ° C., and more preferably 130 to 150° C. The heating time is usually about 1 to 60 minutes, preferably 1 to 30 minutes, and more preferably 5 to 15 minutes.

The thickness of the separation layer is not particularly limited, but is preferably 400 nm or less, more preferably 300 nm or less, still more preferably 200 nm or less, even more preferably 100 nm or less, further more preferably 60 nm or less, and still further more preferably 30 nm or less.

There is no limitation on the shape of the composite semipermeable membrane of the present invention. That is, the composite semipermeable membrane can take any conceivable membrane shapes, such as a flat membrane or a spiral element. Further, conventionally known various treatments may be applied to the composite semipermeable membrane so as to improve its salt-rejecting property, water permeability, and oxidation resistance.

Further, the composite semipermeable membrane may be of a dry type from the viewpoint of excellent processability and storage stability. When drying treatment is carried out, the shape of the composite semipermeable membrane is not limited at all. That is, drying treatment is possible in all possible membrane shapes including flat membrane shapes or spiral element shapes. For example, a membrane unit is formed by processing a composite semipermeable membrane into a spiral shape, and a dry spiral element is formed by drying the membrane unit.

EXAMPLE

The present invention will, hereinafter, be described with reference to Examples, but the present invention is not limited at all by these Examples.

Measuring Method (Measurement of Water Permeability Coefficient and Salt Rejection Rate in RO Test)

The prepared flat shape composite semipermeable membrane was cut into a predetermined shape and size, and was set to a cell for flat shape evaluation. An aqueous solution containing 2000 mg/L NaCl and being adjusted to pH 6.5 to 7 with NaOH was allowed to contact to a supply side and permeation side of the membrane at a differential pressure of 1.5 MPa at 25° C. for 30 minutes. A permeation velocity and electric conductivity of the permeated water obtained by this operation were measured, and a water permeability coefficient ($m^3/m^2 \cdot Pa \cdot s$) and the salt rejection rate (%) were calculated. The correlation (calibration curve) of the NaCl concentration and electric conductivity of the aqueous solution was made beforehand, and the salt rejection rate was calculated by the following equation.

Salt rejection rate (%)={1−(NaCl concentration in permeated liquid [mg/L]}/{NaCl concentration in supply solution) [mg/L]}×100

(Measurement of Single Gas Permeation Rate and Gas Separation Coefficient in Gas Permeation Test)

The prepared flat shape composite semipermeable membrane was cut into a predetermined shape and size, and was set to a cell for flat shape gas permeation test. A single gas (nitrogen, hydrogen, methane, carbon dioxide) was supplied with a supply gas pressure of 105 kPa, and a volume of the permeated gas was measured. The operating temperature was 25° C. Based on the values obtained by this operation, a permeation rate ($mol/m^2 \cdot Pa \cdot s$) of each single gas and a gas separation coefficient (to $CO_2$) of the membrane were calculated.

Gas separation coefficient (to $CO_2$)=(single gas permeation rate/$CO_2$ single gas permeation rate)

(Measurement of Water Permeation Rate and Separation Coefficient in VP Test)

The prepared flat shape composite semipermeable membrane was cut into a predetermined shape and size, and was set to a cell for flat shape VP evaluation. An IPA aqueous solution containing 10 wt % of water and 90 wt % of IPA was placed in a feed liquid tank. A portion of the IPA aqueous solution was heated to 105° C. to form a gas, and the gas was continuously supplied to the surface of the composite semipermeable membrane. A non-permeable gas was cooled and liquefied, and returned to the feed liquid tank for circulation. The feed liquid tank caused atmospheric pressure release to be maintained through a vent port. The permeate side was sucked by a vacuum pump at 1 kPa, the permeated gas was collected in a trap using liquid nitrogen, and the weight of the liquid collected in a predetermined time was measured. For the concentration measurement on the supply side and the permeate side, composition analysis was performed using gas chromatography (GC-14B manufactured by Shimadzu Corporation). Based on the values obtained by this operation, the water permeation rate (kg/$m^2 \cdot h$) and a separation coefficient of the membrane were calculated.

Separation coefficient=(permeate side water concentration/permeate side IPA concentration)/(supply side water concentration/supply side IPA concentration)

Example 1

Figure 4:
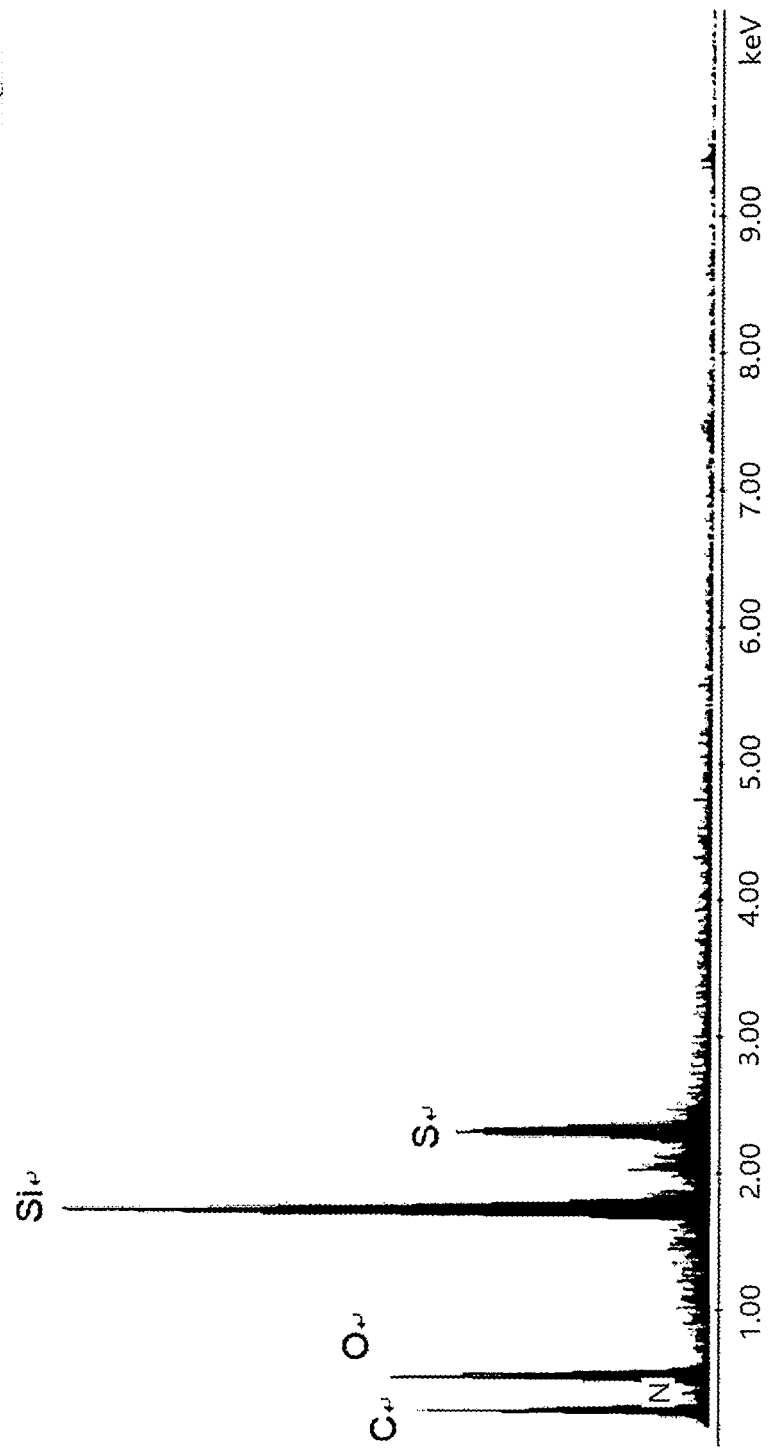
FIG. 4 is an EDX measurement result of a surface of the composite semipermeable membrane produced in Example 1.

A porous polysulfone support (Psf) (manufactured by Nitto Denko Corporation, asymmetric membrane, average pore size on thin film formation side of 20 nm) was mounted on a stainless steel mold. An aqueous solution containing 0.03% by weight of sodium dodecyl sulfate (SLS) (manufactured by Wako Pure Chemical Industries, Ltd.) was applied onto the porous polysulfone support, and then the mold was tilted to remove an excess aqueous solution to form a water film on the porous polysulfone support. Next, a hexane solution containing 5% by weight of bis((3-triethoxysilyl)propyl)amine (BTESPA) (manufactured by Wako Pure Chemical Industries, Ltd.) was applied onto the water film, and allowed to stand for 5 minutes. After that, the mold was tilted to remove an excess solution, the formed film surface was dried with a dryer, and, in addition, the film was allowed to stand in a drying machine at 150° C. for 10 minutes to form a separation layer on the porous polysulfone support, and thus to prepare a composite semipermeable membrane. When observed by SEM, the separation layer had a thickness of about 20 nm (see FIG. 1). When the surface of the separation layer was measured by EDX, the presence of Si was confirmed (see FIG. 4). The RO test was performed using the produced composite semipermeable membrane. The results are shown in Table 1.

Example 2

Figure 2:
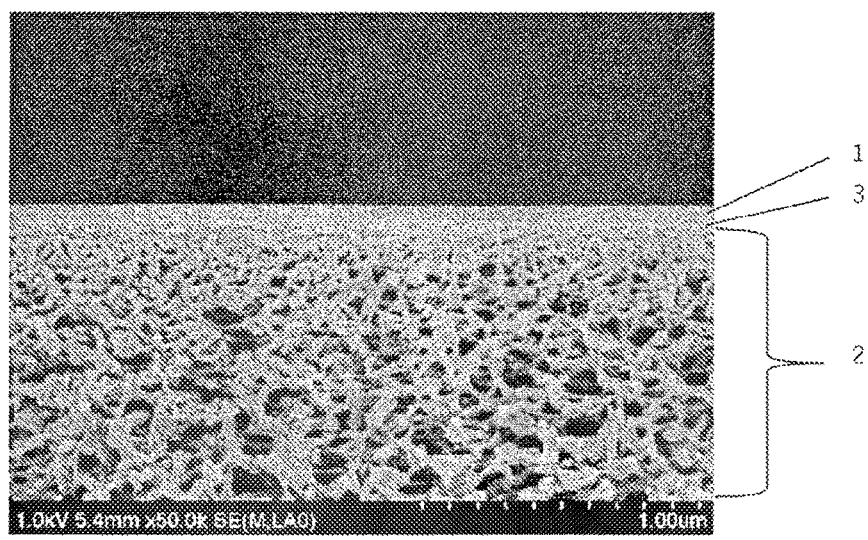
FIG. 2 is a SEM photograph of a cross section of a composite semipermeable membrane prepared in Example 2.

A porous polyether sulfone support (NTR7430 manufactured by Nitto Denko Corporation, asymmetric membrane, NaCl rejection rate of 30% (evaluation conditions: 0.2% NaCl aqueous solution, operating pressure of 10 kgf/$cm^2$, pH of 6.5, 25° C.)) was mounted on a stainless steel mold. An aqueous solution containing 0.03% by weight of sodium dodecyl sulfate (SLS) (manufactured by Wako Pure Chemical Industries, Ltd.) was applied onto the porous polyether sulfone support, and then the mold was tilted to remove an excess aqueous solution to form a water film on the porous polyether sulfone support. Next, a hexane solution containing 5% by weight of bis((3-triethoxysilyl)propyl)amine (BTESPA) (manufactured by Wako Pure Chemical Industries, Ltd.) was applied onto the water film, and allowed to stand for 5 minutes. After that, the mold was tilted to remove an excess solution, the formed film surface was dried with a dryer, and, in addition, the film was allowed to stand in a drying machine at 150° C. for 10 minutes to form a separation layer on the porous polyether sulfone support, and thus to prepare a composite semipermeable membrane. When observed by SEM, the separation layer had a thickness of about 60 nm (see FIG. 2). When the surface of the separation layer was measured by EDX, the presence of Si was confirmed. Each test was performed using the produced composite semipermeable membrane. The results are shown in Tables 1 to 3.

Example 3

A porous polyether sulfone support (NTR7430 manufactured by Nitto Denko Corporation, asymmetric membrane, NaCl rejection rate of 30% (evaluation conditions: 0.2% NaCl aqueous solution, operating pressure of 10 kgf/$cm^2$, pH of 6.5, 25° C.)) was mounted on a stainless steel mold. An aqueous solution containing 0.15% by weight of sodium dodecyl sulfate (SLS) (manufactured by Wako Pure Chemical Industries, Ltd.) was applied onto the porous polyether sulfone support, and then the mold was tilted to remove an excess aqueous solution to form a water film on the porous polyether sulfone support. Next, a hexane solution containing 5% by weight of bis((3-triethoxysilyl)propyl)amine (BTESPA) (manufactured by Wako Pure Chemical Industries, Ltd.) was applied onto the water film, and allowed to stand for 5 minutes. After that, the mold was tilted to remove an excess solution, the formed film surface was dried with a dryer, and, in addition, the film was allowed to stand in a drying machine at 150° C. for 10 minutes to form a separation layer on the porous polyether sulfone support, and thus to prepare a composite semipermeable membrane. When observed by SEM, the separation layer had a thickness of about 100 nm. When the surface of the separation layer was measured by EDX, the presence of Si was confirmed. The RO test was performed using the produced composite semipermeable membrane. The results are shown in Table 1.

Example 4

A porous polyether sulfone support (NTR7430 manufactured by Nitto Denko Corporation, asymmetric membrane, NaCl rejection rate of 30% (evaluation conditions: 0.23 NaCl aqueous solution, operating pressure of 10 kgf/cm$^2$, pH of 6.5, 25° C.)) was mounted on a stainless steel mold. An aqueous solution containing 0.03% by weight of sodium dodecyl sulfate (SLS) (manufactured by Wako Pure Chemical Industries, Ltd.) was applied onto the porous polyether sulfone support, and then the mold was tilted to remove an excess aqueous solution to form a water film on the porous polyether sulfone support. Next, a hexane solution containing 2.5% by weight of bis((3-triethoxysilyl)propyl)amine (BTESPA) (manufactured by Wako Pure Chemical Industries, Ltd.) was applied onto the water film, and allowed to stand for 5 minutes. After that, the mold was tilted to remove an excess solution, the formed film surface was dried with a dryer, and, in addition, the film was allowed to stand in a drying machine at 150° C. for 10 minutes to form a separation layer on the porous polyether sulfone support, and thus to prepare a composite semipermeable membrane. When observed by SEM, the separation layer had a thickness of about 100 nm. When the surface of the separation layer was measured by EDX, the presence of Si was confirmed. The RO test was performed using the produced composite semipermeable membrane. The results are shown in Table 1.

Comparative Example 1

Figure 3:
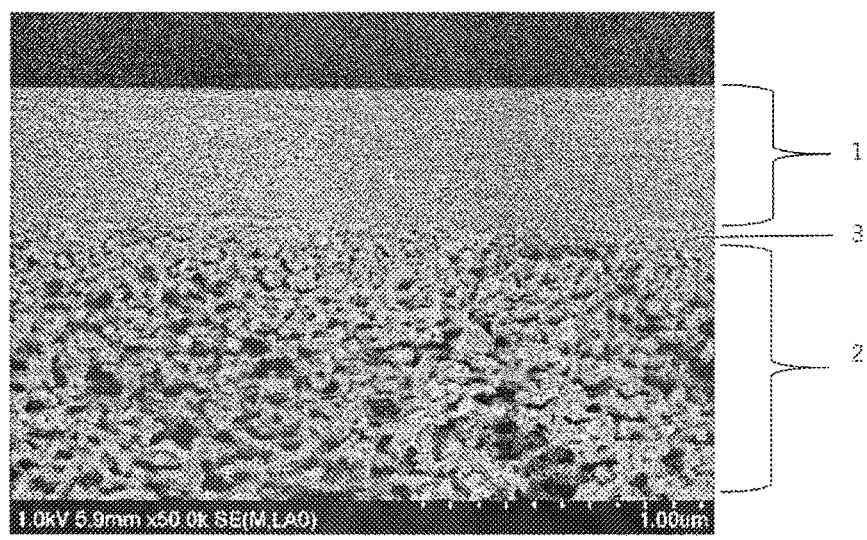
FIG. 3 is a SEM photograph of a cross section of a composite semipermeable membrane prepared in Comparative Example 1.

60 equivalents of water were added to an ethanol solution containing bis(triethoxysilyl)ethane (BTESE) and stirred at room temperature for 2 hours to prepare a sol containing 5% by weight of bis(triethoxysilyl)ethane. It was confirmed by DLS that the particle size of the sol was 2 to 3 nm. Then, the sol was diluted with ethanol so that the concentration of bis(triethoxysilyl)ethane was 1% by weight, sealed, and stored in a refrigerator at 4° C. Then, the sol was coated onto a porous polyether sulfone support (NTR7430 manufactured by Nitto Denko Corporation, asymmetric membrane, NaCl rejection rate of 30% (evaluation conditions: 0.20 NaCl aqueous solution, operating pressure of 10 kgf/cm$^2$, pH of 6.5, 25° C.)) and heated at 150° C. for 10 minutes under a nitrogen stream to form a separation layer on the porous polyether sulfone support, and thus to prepare a composite semipermeable membrane. When observed by SEM, the separation layer had a thickness of about 470 nm (see FIG. 3). When the surface of the separation layer was measured by EDX, the presence of Si was confirmed. The RO test was performed using the produced composite semipermeable membrane. The results are shown in Table 1.

TABLE 1

| | | Raw material for separation layer | | | RO test | |
|---|---|---|---|---|---|---|
| | Porous support | BTESPA (wt %) | BTESE (wt %) | SLS (wt %) | Salt rejection rate (%) | Water permeability coefficient (m$^3$/m$^2$ · Pa · s) |
| Example 1 | Psf | 5 | — | 0.03 | 85 | 7.3 × 10$^{-13}$ |
| Example 2 | NTR7430 | 5 | — | 0.03 | 96 | 5.2 × 10$^{-13}$ |
| EXAMPLE 3 | NTR7430 | 5 | — | 0.15 | 88 | 6.2 × 10$^{-13}$ |
| EXAMPLE 4 | NTR7430 | 2.5 | — | 0.03 | 84 | 14 × 10$^{-13}$ |
| Comparative Example 1 | NTR7430 | — | 1 | — | 90 | 2.4 × 10$^{-13}$ |

TABLE 2

| | Porous support | Raw material for separation layer | | Gas permeation test | | | | | | | |
|---|---|---|---|---|---|---|---|---|---|---|---|
| | | BTESPA (wt %) | SLS (wt %) | Single gas permeation rate (mol/m$^2$ · Pa · s) | | | | Gas separation coefficient (to $CO_2$) | | | |
| | | | | $CO_2$ | $CH_4$ | $H_2$ | $N_2$ | $CO_2$ | $CH_4$ | $H_2$ | $N_2$ |
| Example 2 | NTR7430 | 5 | 0.03 | 2.2 × 10$^{-6}$ | 3.4 × 10$^{-6}$ | 7.5 × 10$^{-6}$ | 2.4 × 10$^{-6}$ | 1.0 | 1.5 | 3.4 | 1.1 |

TABLE 3

| | Porous support | Raw material for separation layer | | VP test | |
| --- | --- | --- | --- | --- | --- |
| | | BTESPA (wt %) | SLS (wt %) | Water permeation rate (kg/m² · h) | Separation coefficient |
| Example 2 | NTR7430 | 5 | 0.03 | 2.9 | 1250 |

Example 5

A porous polyether sulfone support (NTR7430 manufactured by Nitto Denko Corporation, asymmetric membrane, NaCl rejection rate of 30% (evaluation conditions: 0.2% NaCl aqueous solution, operating pressure of 10 kgf/cm², pH of 6.5, 25° C.)) was mounted on a stainless steel mold. An aqueous solution containing 0.03% by weight of sodium dodecyl sulfate (SLS) (manufactured by Wako Pure Chemical Industries, Ltd.) was applied onto the porous polyether sulfone support, and then the mold was tilted to remove an excess aqueous solution to form a water film on the porous polyether sulfone support. Next, a hexane solution containing 5% by weight of bis((3-trimethoxysilyl)propyl)amine (manufactured by Wako Pure Chemical Industries, Ltd.) was applied onto the water film, and allowed to stand for 5 minutes. After that, the mold was tilted to remove an excess solution, the formed film surface was dried with a dryer, and, in addition, the film was allowed to stand in a drying machine at 150° ° C. for 10 minutes to form a separation layer on the porous polyether sulfone support, and thus to prepare a composite semipermeable membrane. When observed by SEM, the separation layer had a thickness of 120 nm or less. When the surface of the separation layer was measured by EDX, the presence of Si was confirmed. The RO test was performed using the produced composite semipermeable membrane. The results are shown in Table 4.

Example 6

A porous polyether sulfone support (NTR7430 manufactured by Nitto Denko Corporation, asymmetric membrane, NaCl rejection rate of 30% (evaluation conditions: 0.2% NaCl aqueous solution, operating pressure of 10 kgf/cm², pH of 6.5, 25° C.)) was mounted on a stainless steel mold. An aqueous solution containing 0.03% by weight of sodium dodecyl sulfate (SLS) (manufactured by Wako Pure Chemical Industries, Ltd.) was applied onto the porous polyether sulfone support, and then the mold was tilted to remove an excess aqueous solution to form a water film on the porous polyether sulfone support. Next, a hexane solution containing 5% by weight of a mixture of bis((3-triethoxysilyl)propyl)amine (manufactured by Wako Pure Chemical Industries, Ltd.) and 1,2-bis(triethoxysilyl)ethene (manufactured by Gelest Corporation) in molar ratio 1:1 was applied onto the water film, and allowed to stand for 5 minutes. After that, the mold was tilted to remove an excess solution, the formed film surface was dried with a dryer, and, in addition, the film was allowed to stand in a drying machine at 150° C. for 10 minutes to form a separation layer on the porous polyether sulfone support, and thus to prepare a composite semipermeable membrane. When observed by SEM, the separation layer had a thickness of 100 nm or less. When the surface of the separation layer was measured by EDX, the presence of Si was confirmed. The RO test was performed using the produced composite semipermeable membrane. The results are shown in Table 4.

Example 7

A porous polyether sulfone support (NTR7430 manufactured by Nitto Denko Corporation, asymmetric membrane, NaCl rejection rate of 30% (evaluation conditions: 0.2% NaCl aqueous solution, operating pressure of 10 kgf/cm², pH of 6.5, 25° C.)) was mounted on a stainless steel mold. An aqueous solution containing 0.03% by weight of sodium dodecyl sulfate (SLS) (manufactured by Wako Pure Chemical Industries, Ltd.) was applied onto the porous polyether sulfone support, and then the mold was tilted to remove an excess aqueous solution to form a water film on the porous polyether sulfone support. Next, a hexane solution containing 5% by weight of a mixture of 1,4-bis((triethoxysilyl)methyl)-1,2,3-triazole synthesized according to literature (K. Yamamoto, M. Kanezashi, T. Tsuru, J. Ohshita, Polymer Journal, 2017, 49, 401-406) and 1,2-bis(triethoxysilyl)ethane (manufactured by Wako Pure Chemical Industries, Ltd.) in molar ratio 1:10 was applied onto the water film, and allowed to stand for 5 minutes. After that, the mold was tilted to remove an excess solution, the formed film surface was dried with a dryer, and, in addition, the film was allowed to stand in a drying machine at 150° C. for 10 minutes to form a separation layer on the porous polyether sulfone support, and thus to prepare a composite semipermeable membrane. When observed by SEM, the separation layer had a thickness of 100 nm or less. When the surface of the separation layer was measured by EDX, the presence of Si was confirmed. The RO test was performed using the produced composite semipermeable membrane. The results are shown in Table 4.

Example 8

A porous polyether sulfone support (NTR7430 manufactured by Nitto Denko Corporation, asymmetric membrane, NaCl rejection rate of 30% (evaluation conditions: 0.2% NaCl aqueous solution, operating pressure of 10 kgf/cm², pH of 6.5, 25° C.)) was mounted on a stainless steel mold. An aqueous solution containing 0.03% by weight of sodium dodecyl sulfate (SLS) (manufactured by Wako Pure Chemical Industries, Ltd.) was applied onto the porous polyether sulfone support, and then the mold was tilted to remove an excess aqueous solution to form a water film on the porous polyether sulfone support. Next, a hexane solution containing 5% by weight of a mixture of 1,4-bis((triethoxysilyl)methyl)-1,2,3-triazole synthesized according to literature (K. Yamamoto, M. Kanezashi, T. Tsuru, J. Ohshita, Polymer Journal, 2017, 49, 401-406) and 1,2-bis(triethoxysilyl)ethane (manufactured by Wako Pure Chemical Industries, Ltd.) in molar ratio 1:5 was applied onto the water film, and allowed to stand for 5 minutes. After that, the mold was tilted to remove an excess solution, the formed film surface was dried with a dryer, and, in addition, the film was allowed to stand in a drying machine at 150° C. for 10 minutes to form a separation layer on the porous polyether sulfone support, and thus to prepare a composite semipermeable membrane. When observed by SEM, the separation layer had a thickness of 100 nm or less. When the surface of the separation layer was measured by EDX, the presence of Si was confirmed. The RO test was performed using the produced composite semipermeable membrane. The results are shown in Table 4.

Example 9

A porous polyether sulfone support (NTR7430 manufactured by Nitto Denko Corporation, asymmetric membrane, NaCl rejection rate of 30% (evaluation conditions: 0.2% NaCl aqueous solution, operating pressure of 10 kgf/cm$^2$, pH of 6.5, 25° C.)) was mounted on a stainless steel mold. An aqueous solution containing 0.03% by weight of sodium dodecyl sulfate (SLS) (manufactured by Wako Pure Chemical Industries, Ltd.) was applied onto the porous polyether sulfone support, and then the mold was tilted to remove an excess aqueous solution to form a water film on the porous polyether sulfone support. Next, a hexane solution containing 5% by weight of a mixture of 1,4-bis((triethoxysilyl)methyl)-1,2,3-triazole synthesized according to literature (K. Yamamoto, M. Kanezashi, T. Tsuru, J. Ohshita, Polymer Journal, 2017, 49, 401-406) and 1,2-bis(triethoxysilyl)ethane (manufactured by Wako Pure Chemical Industries, Ltd.) in molar ratio 1:3 was applied onto the water film, and allowed to stand for 5 minutes. After that, the mold was tilted to remove an excess solution, the formed film surface was dried with a dryer, and, in addition, the film was allowed to stand in a drying machine at 150° C. for 10 minutes to form a separation layer on the porous polyether sulfone support, and thus to prepare a composite semipermeable membrane. When observed by SEM, the separation layer had a thickness of 100 nm or less. When the surface of the separation layer was measured by EDX, the presence of Si was confirmed. The RO test was performed using the produced composite semipermeable membrane. The results are shown in Table 4.

Example 10

A porous polyether sulfone support (NTR7430 manufactured by Nitto Denko Corporation, asymmetric membrane, NaCl rejection rate of 30% (evaluation conditions: 0.2% NaCl aqueous solution, operating pressure of 10 kgf/cm$^2$, pH of 6.5, 25° C.)) was mounted on a stainless steel mold. An aqueous solution containing 0.03% by weight of sodium dodecyl sulfate (SLS) (manufactured by Wako Pure Chemical Industries, Ltd.) was applied onto the porous polyether sulfone support, and then the mold was tilted to remove an excess aqueous solution to form a water film on the porous polyether sulfone support. Next, a hexane solution containing 5% by weight of a mixture of 1,4-bis((triethoxysilyl)methyl)-1,2,3-triazole synthesized according to literature (K. Yamamoto, M. Kanezashi, T. Tsuru, J. Ohshita, Polymer Journal, 2017, 49, 401-406) and 1,2-bis(triethoxysilyl)ethene (manufactured by Gelest Corporation) in molar ratio 1:5 was applied onto the water film, and allowed to stand for 5 minutes. After that, the mold was tilted to remove an excess solution, the formed film surface was dried with a dryer, and, in addition, the film was allowed to stand in a drying machine at 150° C. for 10 minutes to form a separation layer on the porous polyether sulfone support, and thus to prepare a composite semipermeable membrane. When observed by SEM, the separation layer had a thickness of 100 nm or less. When the surface of the separation layer was measured by EDX, the presence of Si was confirmed. The RO test was performed using the produced composite semipermeable membrane. The results are shown in Table 4.

Example 11

A porous polyether sulfone support (NTR7430 manufactured by Nitto Denko Corporation, asymmetric membrane, NaCl rejection rate of 30% (evaluation conditions: 0.2% NaCl aqueous solution, operating pressure of 10 kgf/cm$^2$, pH of 6.5, 25° C.)) was mounted on a stainless steel mold. An aqueous solution containing 0.03% by weight of sodium dodecyl sulfate (SLS) (manufactured by Wako Pure Chemical Industries, Ltd.) was applied onto the porous polyether sulfone support, and then the mold was tilted to remove an excess aqueous solution to form a water film on the porous polyether sulfone support. Next, a hexane solution containing 5% by weight of a mixture of 1,4-bis((triethoxysilyl)methyl)-1,2,3-triazole synthesized according to literature (K. Yamamoto, M. Kanezashi, T. Tsuru, J. Ohshita, Polymer Journal, 2017, 49, 401-406) and triethoxyvinylsilane (manufactured by Wako Pure Chemical Industries, Ltd.) in molar ratio 1:3 was applied onto the water film, and allowed to stand for 5 minutes. After that, the mold was tilted to remove an excess solution, the formed film surface was dried with a dryer, and, in addition, the film was allowed to stand in a drying machine at 150° ° C. for 10 minutes to form a separation layer on the porous polyether sulfone support, and thus to prepare a composite semipermeable membrane. When observed by SEM, the separation layer had a thickness of 100 nm or less. When the surface of the separation layer was measured by EDX, the presence of Si was confirmed. The RO test was performed using the produced composite semipermeable membrane. The results are shown in Table 4.

Example 12

A porous polyether sulfone support (NTR7430 manufactured by Nitto Denko Corporation, asymmetric membrane, NaCl rejection rate of 30% (evaluation conditions: 0.2% NaCl aqueous solution, operating pressure of 10 kgf/cm$^2$, pH of 6.5, 25° C.)) was mounted on a stainless steel mold. An aqueous solution containing 0.03% by weight of sodium dodecyl sulfate (SLS) (manufactured by Wako Pure Chemical Industries, Ltd.) was applied onto the porous polyether sulfone support, and then the mold was tilted to remove an excess aqueous solution to form a water film on the porous polyether sulfone support. Next, a hexane solution containing 5% by weight of a mixture of 4,6-bis(3-(triethoxysilyl)propoxy)pyrimidine synthesized according to literature (L. Yu, M. Kanezashi, H. Nagasawa, J. Ohshita, A. Naka, T. Tsuru, Industrial & Engineering Chemistry Research, 2017, 56, 1316-1326) and triethoxyvinylsilane (manufactured by Wako Pure Chemical Industries, Ltd.) in molar ratio 1:1 was applied onto the water film, and allowed to stand for 5 minutes. After that, the mold was tilted to remove an excess solution, the formed film surface was dried with a dryer, and, in addition, the film was allowed to stand in a drying machine at 150° C. for 10 minutes to form a separation layer on the porous polyether sulfone support, and thus to prepare a composite semipermeable membrane. When observed by SEM, the separation layer had a thickness of 100 nm or less. When the surface of the separation layer was measured by EDX, the presence of Si was confirmed. The RO test was performed using the produced composite semipermeable membrane. The results are shown in Table 4.

TABLE 4

| | RO test | |
|---|---|---|
| | Salt rejection rate (%) | Water permeability coefficient ($m^3/m^2 \cdot Pa \cdot s$) |
| Example 5 | 97 | $3.1 \times 10^{-13}$ |
| Example 6 | 84 | $1.4 \times 10^{-12}$ |
| Example 7 | 83 | $1.3 \times 10^{-12}$ |
| Example 8 | 85 | $1.6 \times 10^{-12}$ |
| Example 9 | 90 | $1.7 \times 10^{-13}$ |
| Example 10 | 95 | $1.2 \times 10^{-13}$ |
| Example 11 | 86 | $2.8 \times 10^{-13}$ |
| Example 12 | 93 | $2.9 \times 10^{-14}$ |

INDUSTRIAL APPLICABILITY

The composite semipermeable membrane of the present invention is suitably used for production of ultrapure water, desalination of brackish water or sea water, etc., and usable for removing or collecting pollution sources or effective substances from pollution, which causes environment pollution occurrence, such as dyeing drainage and electrodeposition paint drainage, leading to contribute to closed system for drainage. Furthermore, the membrane can be used for concentration of active ingredients in foodstuffs usage, for an advanced water treatment, such as removal of harmful component in water purification and sewage usage etc. Moreover, the membrane can be used for waste water treatment in oil fields or shale gas fields. Further, the composite semipermeable membrane can be used as a gas separation membrane that selectively separates a specific gas species from a mixed gas. Furthermore, the composite semipermeable membrane can be used as a separation membrane for a PV method (pervaporation method) or a VP method (vapor permeation method) for separating alcohol and water from an aqueous alcohol solution.

DESCRIPTION OF REFERENCE SIGNS

1 Separation layer
2 Porous polysulfone support
3 Polyether sulfone layer (NF membrane)

The invention claimed is:

1. A composite semipermeable membrane comprising a separation layer on a surface of a porous support,
   wherein the separation layer comprises a cross-linked condensate having a siloxane bond and a —Si—$R^7$—$NR^8$—$R^9$—Si— bond; wherein $R^7$ and $R^9$ are each independently a saturated hydrocarbon group having 1 to 12 carbon atoms or an unsaturated hydrocarbon group having 2 to 12 carbon atoms; and $R^8$ is hydrogen, an alkyl group having 1 to 12 carbon atoms, or an alkenyl group having 2 to 12 carbon atoms.

2. A composite semipermeable membrane comprising a separation layer on a surface of a porous support,
   wherein the separation layer comprises a cross-linked condensate having a siloxane bond and a —Si—Y—Si— bond, where Y is a functional group having a heterocycle.

3. The composite semipermeable membrane according to claim 1, wherein the separation layer has a thickness of 400 nm or less.

4. The composite semipermeable membrane according to claim 2, wherein the separation layer has a thickness of 400 nm or less.

* * * * *